United States Patent [19]

McElroy et al.

[11] Patent Number: 5,122,239

[45] Date of Patent: Jun. 16, 1992

[54] FUEL CELL PRODUCT LIQUID GAS STRIPPER

[75] Inventors: James F. McElroy, Suffield, Conn.; William F. Smith, Feeding Hills, Mass.

[73] Assignee: United Technologies Corporation, Hartford, Conn.

[21] Appl. No.: 386,915

[22] Filed: Jul. 31, 1989

[51] Int. Cl.$^5$ ............... C25B 1/00; C25B 9/00; C25B 13/00
[52] U.S. Cl. ................... 204/101; 204/151; 204/252; 204/265; 204/266; 204/263; 210/748
[58] Field of Search ............... 204/101, 151, 263, 265, 204/266, 130, 252; 210/748; 429/30, 41, 44, 40

[56] References Cited

U.S. PATENT DOCUMENTS

| | | | |
|---|---|---|---|
| 3,479,224 | 11/1969 | Jäger | 136/86 |
| 4,085,255 | 4/1978 | Grave et al. | 429/26 |
| 4,478,696 | 10/1984 | Allen | 204/265 |
| 4,530,886 | 7/1985 | Sederquist | 429/13 |
| 4,543,303 | 9/1985 | Dantowitz et al. | 429/34 |
| 4,729,932 | 3/1988 | McElroy | 429/34 |
| 4,908,114 | 3/1990 | Ayers | 204/268 |

Primary Examiner—John Niebling
Assistant Examiner—Kathryn Gorgos
Attorney, Agent, or Firm—Charles Sohl; Pamela J. Mercier

[57] ABSTRACT

Removal of gas from an oxidant containing liquid stream by chemically reacting hydrogen and the oxidant gas. The hydrogen is prevented from dissolving in the liquid by an electrochemical hydrogen pump that transports the hydrogen, as ions, back to the hydrogen side of the ion exchange membrane.

6 Claims, 2 Drawing Sheets

FUEL CELL PRODUCT LIQUID GAS STRIPPER

TECHNICAL FIELD

This invention relates to the removal of a gas from a liquid stream, and especially to the removal of an oxidant gas from an liquid stream.

BACKGROUND ART

While the invention will be described in connection with a fuel cell and hydrogen/oxygen chemical reactions, the invention is by no means limited thereto. The liquid gas stripper may just as readily be used with any liquid stream containing a dissolved oxidant gas or gas mixture.

The production of electric power utilizing hydrogen/oxygen fuel cells is well known to the art, especially for use on spacecraft. In such cells, a reactant gas such as hydrogen is oxidized at the anode electrode associated with one side of an ion exchange membrane with the release of electrons. The electrons flow through the external load while the oxidized hydrogen ion is transported through the ion exchange membrane to a cathode electrode associated with the other side of the membrane. An oxidant such as oxygen, fluorine, chlorine, or bromine, is supplied to the cathode. The oxygen is reduced by addition of electrons and combines with hydrogen ions transported across the membrane to form a product liquid such as water. The product liquid formed at the cathode must be removed because it tends to form a film which blocks more oxidant from reaching the electrode. A wetproofing or hydrophobic film may be applied to the cathode to cause the water to bead; thereby preventing the formation of the water film. The beads of water are then removed using a wicking system or an internal hydrophilic porous media.

The by-product water, once removed, can be utilized in various fashions. However, problems arise due to oxygen saturation. If the water is stored, the liberation of oxygen can occur; consuming a volume of the storage facility. In space applications, for example, water can be stored in flexible bladders. When the water is removed for use, some oxygen remains within the bladder, accumulating, and eventually filling the bladder. With the limited storage space, this can cause serious problems. Furthermore, the water which is removed still contains a significant amount of dissolved oxygen. When it is used for ingestion by astronauts, the dissolved oxygen causes discomfort.

It is an objective of this invention to provide an improved technique for the removal of an oxidant from a water stream.

DISCLOSURE OF INVENTION

The present invention comprises a technique for removing virtually all of the dissolved oxidant gas from a water stream, leaving the stream essentially gas free. Hydrogen diffuses through an ion exchange membrane where it is ionized. Dissolved oxygen reacts with the hydrogen ions, forming water. (Oxygen will be used hereafter and is intended to include chlorine, fluorine, and bromine, and the word water will be used hereafter, but does not exclude liquids such as hydrogen chloride, hydrogen fluoride, and hydrogen bromide.) An electrochemical hydrogen pump (disclosed in pending U.S. Pat. application Ser. No. 07/328,279, now U.S. Pat. No. 4,950,371 ) prevents the hydrogen ions from dissolving in the water stream by transporting the excess ions back to the hydrogen side of the ion exchange membrane.

The foregoing and other features and advantages of the present invention will become more apparent from the following description and accompanying drawings.

BEST MODE FOR CARRYING OUT THE INVENTION

The removal of gases from a water stream can be essential, depending upon the intended use for the water. This invention discloses an improved technique for gas removal from a liquid stream. Advantages include providing a gas free water stream for storage and ingestion, and the simultaneous humidification of a hydrogen stream which is advantageous in fuel cell operation. This technique utilizes two electrodes, an electrochemical hydrogen pump, an ion exchange membrane, a water stream containing dissolved oxygen gas, and a hydrogen stream. Critical parameters include the flow rate of the oxygen containing water stream and the hydrogen supply. An electrochemical hydrogen pump also plays an important role in successfully removing the gas.

The flow rate of the oxygen containing water stream is regulated according to the necessary time requirement for oxygen to reach the catalyst reaction sites and react with the hydrogen before being swept away by the water stream; an artisan can easily determine the necessary time for the given stream. The hydrogen stream is preferably an "unlimited" supply of hydrogen such that excess hydrogen is available for both the chemical reaction with oxygen and the fuel cell supply. The hydrogen which reacts with the dissolved oxygen, diffuses through the ion exchange membrane to the water side where it ionizes and reacts with oxygen. The electrochemical hydrogen pump prevents the hydrogen ions from dissolving in the water stream by transporting the excess ions back to the hydrogen side of the ion exchange membrane.

Figure 1:
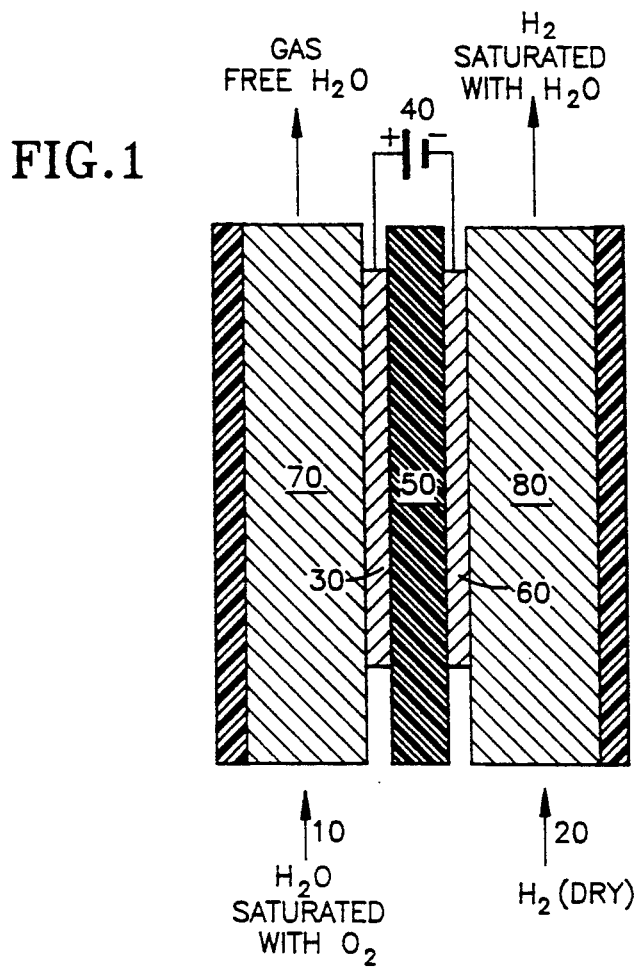
FIG. 1 is a schematic of the aqueous gas stripper described in the present invention.

FIG. 1 shows a basic embodiment of the invention. Oxygen ($O_2$) saturated water ($H_2O$) and hydrogen ($H_2$) (20) are introduced to an anode chamber (70) and a cathode chamber (80), respectively. The chambers are separated by an electrochemical hydrogen pump (40). The electrochemical hydrogen pump (40) consists of two electrodes made of an electrified catalysts (preferably based on a metal selected from the platinum family); one on the water side (anode) (30) and one on the hydrogen side (cathode) (60), with an ion exchange membrane (50), made for example of Nafion ® produced by DuPont deNemours, Inc., located between the electrodes. The hydrogen passes through the membrane (50) to the anode electrode (30) where it is ionized. The hydrogen ions react with the dissolved oxygen forming water. The electrochemical hydrogen pump (40) transports excess hydrogen ions back to the hydrogen side of the ion exchange membrane (50), therefore preventing their dissolution in the water stream (see FIG. 2). Some oxygen and water diffuse through the ion exchange membrane (50). The oxygen reacts with the hydrogen forming water which helps to prehumidify the hydrogen stream (20). Note, a means for producing heat is necessary for the humidification process, especially if large humidification levels are desired.

Figure 2:
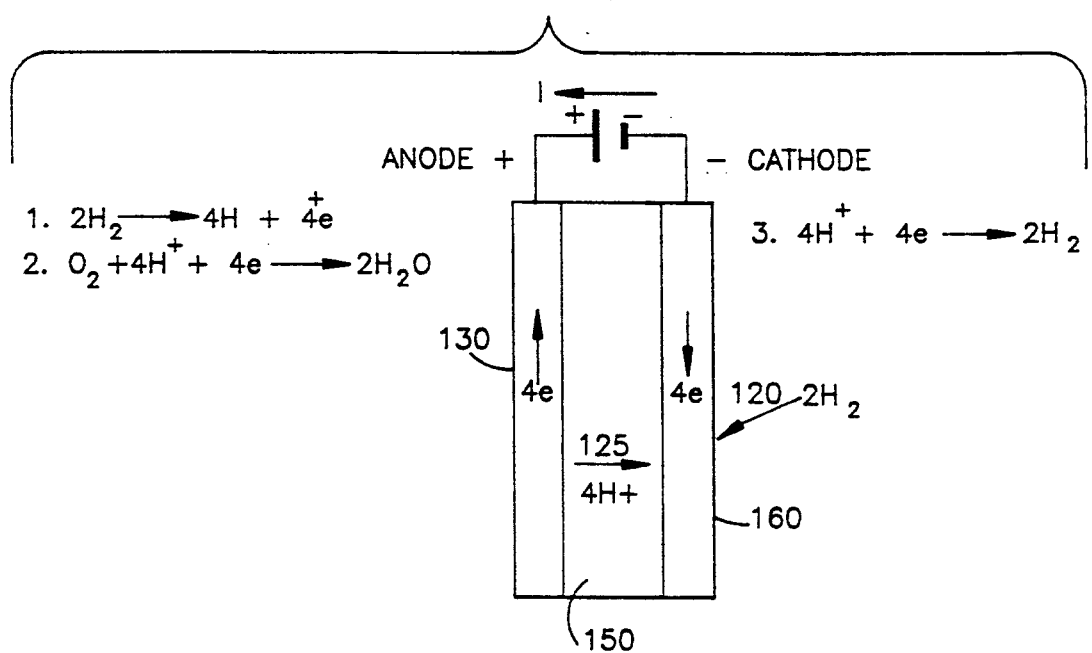
FIG. 2 is an illustration of where various chemical reactions occur with relation to the present invention.

FIG. 2 shows the reactions which occur during the stripping process. Hydrogen (120) diffuses through the ion exchange membrane (150) to the anode electrode (130) where it is ionized (reaction 1). The hydrogen ions then react with the oxygen to form water (reaction 2). The excess hydrogen ions (125) are transported back to the hydrogen side (160) of the ion exchange membrane (150) where they react with electrons to reform hydrogen gas (reaction 3).

Figure 3:
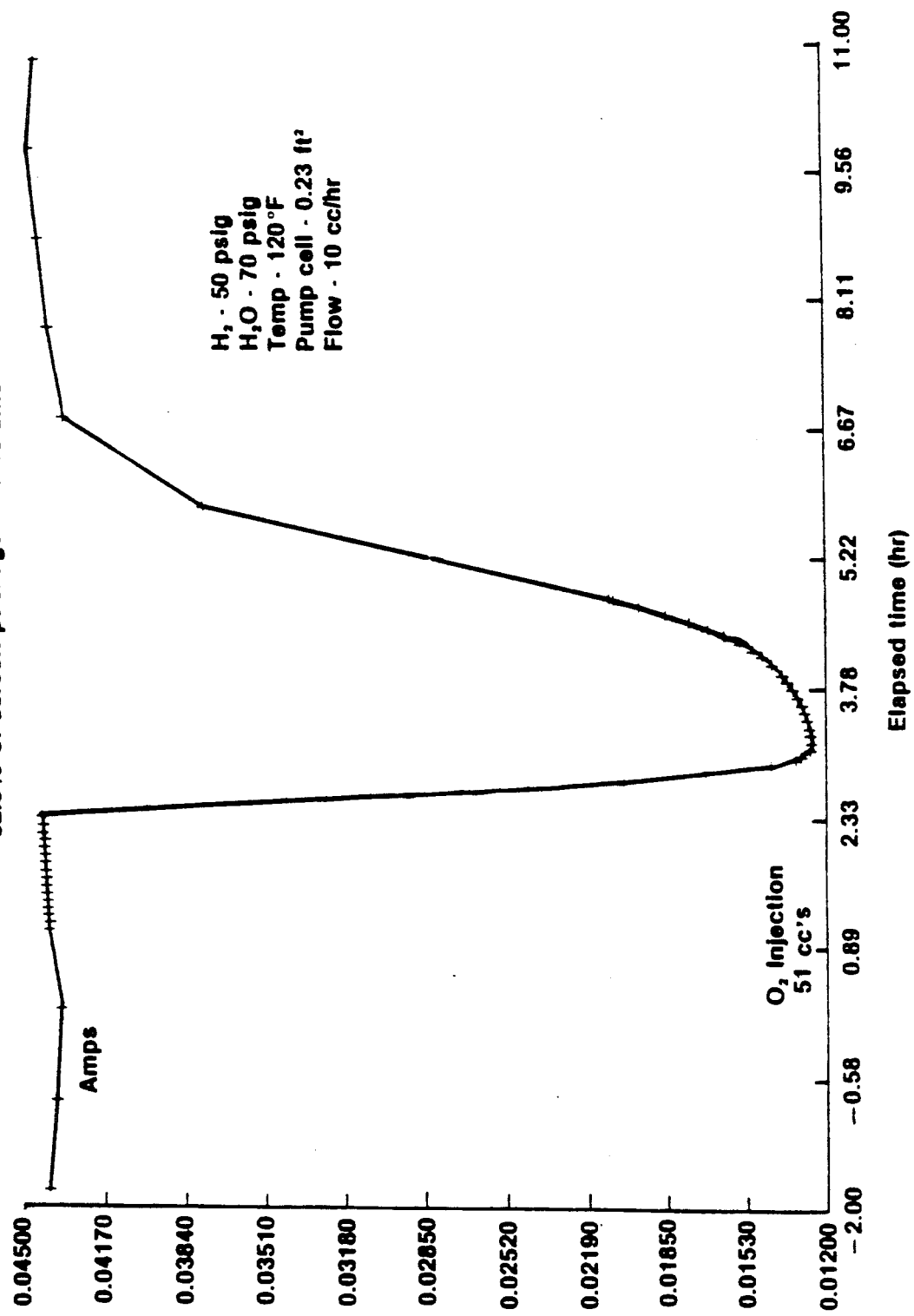
FIG. 3 is a graph of the removal of oxygen from an aqueous stream utilizing the present invention.

The graph (FIG. 3) shows the result of a run utilizing the water gas stripper shown in FIG. 1. Prior to the introduction of an oxygen slug, the invention was operating to remove dissolved oxygen from water at 10 cc/hr, 70 psig, 120° F. and 0.0440 amps. At time zero, 51 cc of oxygen was injected into the water stream. When the oxygen slug reached the electrode (FIG. 1, item 30), the amount of current required to operate the electrochemical hydrogen pump (40) decreased from approximately 0.0440 to about 0.0125 amps (FIG. 3). This is a result of the chemical reaction between the oxygen and the hydrogen. As the hydrogen is consumed by the reaction, less hydrogen ions need to be transported back to the hydrogen side of the ion exchange membrane. After approximately 4.50 hours, virtually all of the oxygen had been removed from the water stream; the electrochemical hydrogen pump again required approximately 0.0440 amps to transport the hydrogen ions to the hydrogen side of the ion exchange membrane. The removal of the slug showed that the system could ingest a surge of gas and still perform its function; the water, at atmospheric pressure, was effectively gas free.

Although this invention has been shown and described with respect to detailed embodiments thereof, it will be understood by those skilled in the art that various changes in form and detail thereof may be made without departing from the spirit and scope of the claimed invention.

We claim:

1. A method for removing an oxidant gas from a liquid stream containing a dissolved oxidant gas, using an electrochemical hydrogen pump incorporating an ion exchange membrane having a hydrogen side with a cathode electrode made of an electrified catalyst and a liquid side with an anode electrode made of an electrified catalyst, which comprises:
    a. flowing the liquid stream by the anode electrode on the liquid said of the ion exchange membrane;
    b. flowing a hydrogen stream by the cathode electrode on the hydrogen side of the ion exchange membrane;
    c. diffusing hydrogen through the ion exchange membrane from the hydrogen side to the liquid side of the ion exchange membrane;
    d. using the anode electrode to ionize the hydrogen;
    e. allowing sufficient time for the dissolved oxidant gas to react with the hydrogen ions;
    f. using the electrochemical hydrogen pump to transport excess hydrogen ions back to the hydrogen side of the ion exchange membrane;

whereby the electrochemical hydrogen pump prevents excess hydrogen from dissolving in the liquid stream, and wherein the chemical reaction between the hydrogen and the oxidant eliminates the oxidant from the liquid stream, leaving the liquid stream virtually gas free.

2. A method as in claim 1 where the cathode and anode electrified catalysts are based on a metal selected from the platinum family.

3. A method as in claim 1 where the oxidant is selected from the group consisting of oxygen, chlorine, fluorine, and bromine.

4. A method as in claim 1 whereby the hydrogen stream is humidified as the dissolved oxidant is simultaneously removed from the liquid stream.

5. A liquid gas stripper, which comprises:
    a. an electrochemical hydrogen pump, said pump having electrodes which are electrified catalysts;
    b. an ion exchange membrane, said membrane having a hydrogen side and a liquid side;
    c. excess hydrogen;

whereby the electrochemical hydrogen pump prevents the excess hydrogen from dissolving in a liquid stream by transporting the hydrogen, as ions, to the hydrogen side of the ion exchange membrane.

6. An essentially gas free water stream which has been produced by stripping oxidant gas from said water stream utilizing a chemical reaction between hydrogen and the oxidant gas, and utilizing an electrochemical hydrogen pump to prevent the hydrogen from dissolving in said water stream.

* * * * *